Patented Dec. 31, 1935

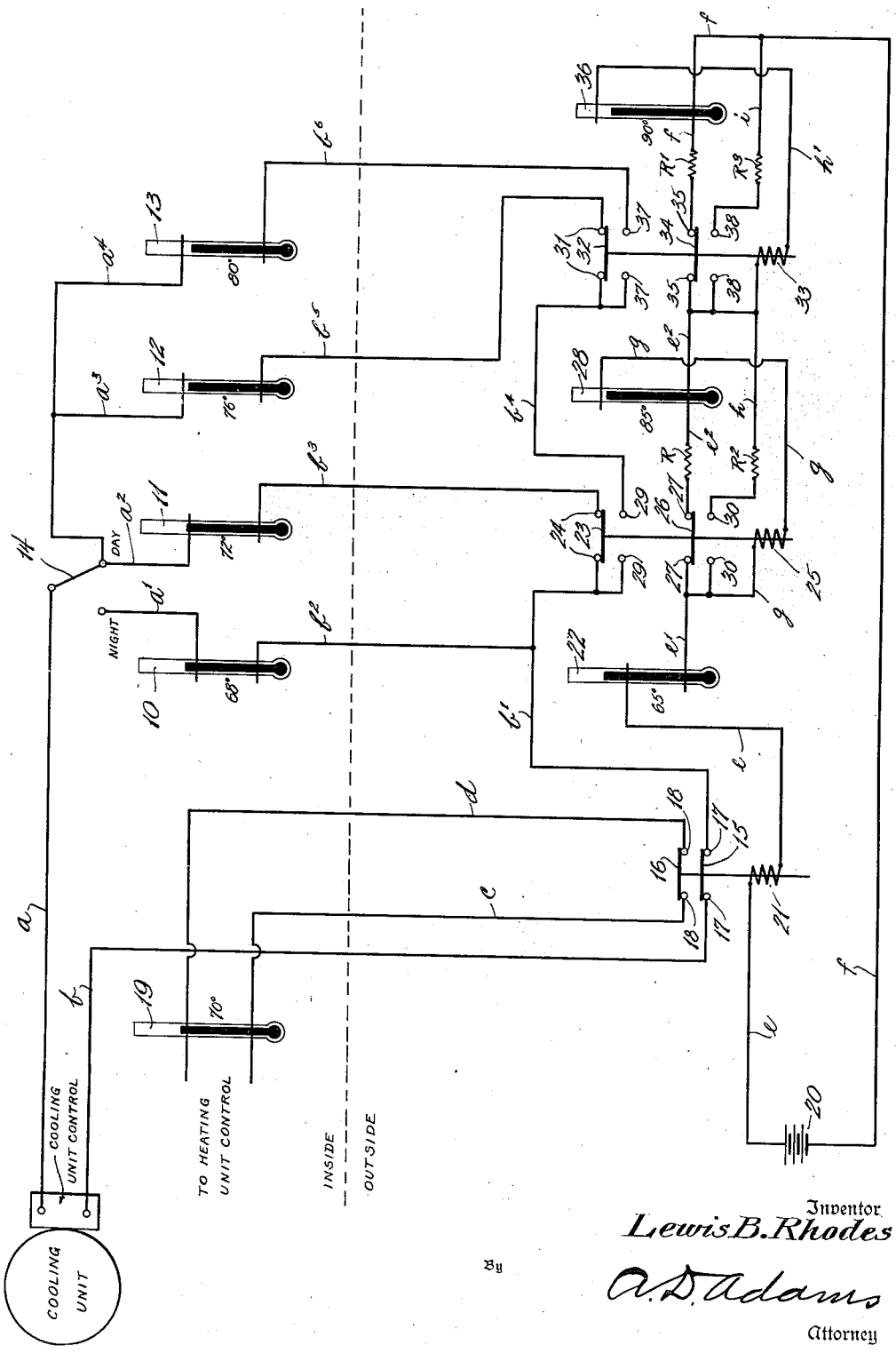

2,026,063

UNITED STATES PATENT OFFICE 2,026,063

AUTOMATIC TEMPERATURE DIFFERENTIAL CONTROL SYSTEM

Lewis B. Rhodes, Washington, D. C., assignor to Vapor Car Heating Company, Inc., Chicago, Ill., a corporation of New York Application August 25, 1932, Serial No. 630,474

2 Claims. (Cl. 236—1)

This invention relates to a method and apparatus for automatically controlling the temperature differential between the outside and the inside of an enclosure or compartment which is cooled and/or heated by electrically governed temperature conditioning systems. More specifically stated, the idea is to automatically control the inside temperature according to the outside temperature variations, thereby avoiding excessive differences which often result from manually and arbitrarily setting ordinary controlling mechanism such as thermostats and the like.

Other aims and advantages of the invention will appear in the specification, when considered in connection with the accompanying drawing, wherein:

The figure is a diagrammatic illustration of a simple form of thermostatic control system embodying the invention.

Artificial or mechanical heating and cooling systems, used separately or in combination, in buildings, railway passenger cars and the like, have introduced serious problems involving proper control to maintain comfortable or desirable inside temperature conditions. For example, the present artificial cooling systems, applied to buildings and railway passenger cars, are largely manually controlled by arbitrarily operating switches, setting thermostats and the like so as to maintain a desired minimum inside temperature. It is very important that the difference between the inside temperature and the outside temperature shall not exceed a predetermined maximum. If the inside is cooled too far below the temperature on the outside, the cost of operation is not only excessive but this condition might impair the health of the occupants. It is altogether unsatisfactory to depend upon the guesswork and manual operation of an attendant. When the outside temperature range is between say, 65° and 85°, the cooling equipment should be so controlled as to maintain a lower temperature of a different range on the inside. As the outside temperature rises to between 85° and, say, 90°, the cooling equipment should be so controlled as to maintain a correspondingly higher temperature range on the inside. Obviously, it would be out of the question to overload a cooling system to maintain an ideal temperature of 70° on the inside when the outside temperature ranges between 100° and 110°. Such a condition would result in serious discomfort to the occupants.

The present invention provides an automatic temperature differential control system which is not dependent upon any arbitrary or manual setting and does not require any thermometer readings. It is designed to maintain temperature differences of predetermined ranges according to all ordinary temperatures encountered on the outside. Moreover, the control mechanism is applicable to either a heating system or a cooling system or a combination of the two systems. It will be described specifically as applicable to the control of a cooling system co-ordinated with a heating system so that the same mechanism is utilized to maintain conditions of comfort during all seasons of the year.

Referring particularly to the drawing, wherein an illustrative system is shown diagrammatically as being controlled by a series of thermostats, the operation of a cooling or refrigerating unit is controlled automatically by a series of thermostats 10, 11, 12, and 13 in the form of mercurial thermometers having wires fused into them so that the mercury columns make and break the circuit to the cooling unit control mechanism. In this instance, a pair of conductors $a$ and $b$ with the fused-in wires provide the circuits through the respective thermostats. These thermostats are inside the space to be cooled and are arranged to control the circuit $a$—$b$ according to outside temperature conditions, thermostat 10 closing the circuit when the inside temperature is, say, 68° Fahrenheit or above, thermostat 11 closing the circuit at 72°, thermostat 12 closing the circuit at 76° and thermostat 13 closing the circuit at 80°. Of course, the different temperatures at which the thermostats will complete the circuit are selected according to the maximum range of outside temperatures and any number of thermostats operating at different selected temperatures may be connected in parallel between the conductors $a$ and $b$. It will be understood that when this circuit is completed through any one of them, the cooling unit is set in operation.

Assuming that the most comfortable inside temperature at night is 68°, the thermostat 10 is adapted to be used exclusively to control the circuit at night; while the other thermostats are adapted to control the circuit during the day when the outside temperature is higher and the variations are greater. A manual switch 14 forming a part of conductor $a$ is here shown as being arranged to connect either the thermostat 10 or the thermostats 11, 12, and 13 to the circuit $a—b$. If the system is applied to a railway passenger car, the porter will throw the switch 14 a night to its "night" position and in the morning to its "day" position and the system will function automatically. In the diagram the switch is in its "day" position.

The circuit $a—b$ to the cooling unit and, also a separate circuit $c—d$ to a heating unit or system are shown as being controlled by a master relay switch having a pair of arms 15 and 16 on its armature adapted to bridge pairs of contacts 17—17 and 18—18 in the respective circuits. When the relay switch is closed, as shown, and completes the circuit $c—d$, it will be understood that the heating unit (not shown) is cut off if it is not already cut off by one of a series of thermostats 19 in circuit $c—d$ corresponding with thermostats 11, 12, and 13. This relay switch is actuated by a source of current such as a storage battery 20 having a circuit $e—f$ connected to the coil 21 of the relay and in series with an outside thermostat 22 arranged to complete the circuit when the outside temperature is, say, 65° or above. When the switch 14 is in its "night" position or thrown to the left, the circuit $a—b$ is traced through conductor $b$, arm 15, branch $b^1$, branch $b^2$, thermostat 10, branch $a^1$, switch 14 and conductor $a$. However, this circuit will be broken by arm 15 when the outside temperature goes below 65° and thermostat 22 breaks the battery circuit $e—f$.

When the switch 14 is in the day position, as shown, and the outside temperature range is between 60° and 85°, the circuit $a—b$ is traced through conductor $b$, arm 15, branch $b^1$, another switch arm 23 of a second relay bridging contacts 24—24, branch $b^3$, thermostat 11, branch $a^2$, switch 14 and conductor $a$. The arm 23 normally bridges the contacts 24—24 and the circuit is adapted to be broken by the relay coil 25, when the outside temperature reaches, say, 85°. Thus, the thermostat 11 governs the cooling unit until the outside temperature reaches 85°. The relay armature also carries a second arm 26 which normally bridges contacts 27—27 in branches $e_1$ and $e_2$ of the battery circuit.

When the outside temperature reaches 85°, another outside thermostat 28 is connected to cause the circuit through thermostat 11 to be broken and to complete the battery circuit through a branch conductor $g$ and the coil 25. To energize the coil 25, a resistance R is placed in the branch $e^2$ between contact 27 and thermostat 28 so that, when the mercury rises and makes contact at the upper end with conductor $g$, the current will be by-passed through conductor $g$ and coil 25. When the coil 25 is energized, the arms 23 and 26 break their respective contacts 24—24 and 27—27 and bridge contacts 29—29 and 30—30 respectively, contacts 30—30 being connected to branch $e^1$ and through a branch $h$, including a resistance $R^2$, to branch $e^2$. The battery circuit $e—f$ is then traced through thermostat 22, branch $e^1$ branch $g$, thermostat 28, branch $e^2$ and on through branch $f$. Any excessive current which might tend to damage the thermostat 28 or dissipate the mercury is by-passed around the thermostat through contacts 30—30, arm 26, branch $h$ and resistance $R^2$ to branch $e^2$. When the upper arm 23 on the relay armature bridges contacts 29—29, the circuit $a—b$ is then traced through conductor $b$, arm 15, branch $b^1$, arm 23, branch $b^4$, another pair of contacts 31 and arm 32 on a third relay, branch $b^5$, thermostat 12, branch $a^3$, switch 14 and conductor $a$. The arm 32 of the third relay functions in the same manner as the arm 23 of the second relay. It normally bridges the contacts 31—31 and the circuit is adapted to be broken by relay winding 33 when the outside temperature reaches, say, 90°, so that the thermostat 12 governs the cooling unit until the outside temperature reaches 90°.

The armature of the third relay carries a second arm 34 which normally bridges contacts 35—35 in branches $e^2$ and conductor $f$ of the battery circuit. When the outside temperature reaches 90°, another outside thermostat 36 is connected to cause the circuit through thermostat 12 to be broken and to complete the battery circuit through branch circuit $h$ and the coil 33. Both of the arms 32 and 34 are adapted to be moved by the relay to bridge pairs of contacts 37—37 and 38—38 when the solenoid winding 33 is energized or the outside temperature reaches 90°. The third relay coil is caused to be energized in the same manner as the second relay coil 25 by means of a resistance $R^1$ in the conductor $f$ between contact 35 and thermostat 36. Contacts 38—38 are carried in a branch conductor $i$ having a resistance $R^3$ which functions to protect the thermostat 36 in the same manner as resistance $R^2$ protects thermostat 28. When the coil 33 is energized, the battery circuit is then traced through conductor $e$, thermostat 22, branch $e^1$, branch $g$, thermostat 28, branch $e^2$ (also through contacts 30—30, arm 26, branch $h$ to branch $e^2$) then through branch $h^1$, thermostat 36 and conductor $f$, (also, through contacts 38—38, arm 34 and branch $i$ into conductor $f$). When the upper arm 32 of the third relay bridges contacts 37—37, the circuit $a—b$ is then traced through conductor $b$, arm 15, branch $b^1$, arm 23 and contacts 29—29, branch $b^4$, arm 32 and contacts 37—37, branch $b^6$, thermostat 13, branch $a^4$, switch 14 and conductor $a$. Thus, the thermostat 13 governs the cooling unit as long as the outside temperature is 90° or above. The other two inside thermostats 11 and 12 are disconnected from the circuit $a—b$ and will remain disconnected if the outside temperature is above 90°. As the outside temperature drops within the ranges of the respective outside thermostats, the different inside thermostats will be automatically connected in the reverse order in the circuit $a—b$ to govern the cooling unit.

While the illustrative apparatus is shown as being connected to control a cooling system including a master control for a heating system (not shown), it will be understood that a similar arrangement of thermostats and relays can be employed to control heating units. Thermostat 22 would then be common to both systems. The inside and outside thermostats for controlling the heating system will, of course, have to operate at different temperatures from those employed in conjunction with the cooling system.

From the foregoing description, it will be seen that the improved system automatically maintains a predetermined temperature differential between the outside and inside without requiring any setting or adjustments when the outside temperature varies. The system also insures absolute comfort to occupants and avoids any excessive variations in temperature. Moreover, it avoids any overloading of the cooling or heating systems.

Obviously, the present invention is not restricted to the particular embodiment thereof herein shown and described. Moreover, it is not indispensable that all the features of the invention be used conjointly since they may be employed advantageously in various combinations and subcombinations.

What I claim is:—

1. In a system for regulating the temperature in an enclosed space, a thermostat responsive to temperature changes outside the space, a relay comprising two pairs of contacts that are closed when the relay is energized, an energizing circuit for the relay that is closed by the thermostat when a predetermined maximum temperature is reached outside the enclosure, a thermostat inside the enclosure, a circuit for controlling a heating unit, the heat being shut off when the circuit is closed, this inside thermostat and one pair of contacts of the relay being connected in parallel in the last mentioned circuit so that the circuit will be closed when the predetermined temperature is reached outside the enclosure or when a second predetermined temperature is reached inside the enclosure, a second thermostat inside the enclosure, a circuit for controlling a cooling unit, the cooling unit being active when this circuit is closed, the last mentioned thermostat and the second pair of contacts on the relay being connected in series in this cooling circuit so that the cooling circuit will be closed whenever both the first mentioned predetermined outside temperature and a predetermined inside temperature are reached.

2. In a system for regulating the temperature in an enclosed space, a circuit for controlling a heating unit, a thermostat inside the space adapted to close said circuit at a predetermined temperature, a second circuit adapted to control a cooling unit, a second thermostat inside the space adapted to close this second circuit at a predetermined temperature, a relay having two sets of contacts, one set functioning to open or close one of the circuits and the other set functioning to open or close the other circuit, an energizing circuit for the relay, and a thermostat responsive to temperature changes outside the space and functioning to close the energizing circuit when a predetermined maximum temperature is reached outside the space.

LEWIS B. RHODES.